United States Patent [19]
Plamondon

[11] Patent Number: 6,149,217
[45] Date of Patent: Nov. 21, 2000

[54] COLLAPSIBLE TRUCK BED TOPPER

[76] Inventor: Ashley J. Plamondon, Box 306, Bentley, Alberta, Canada, T0C 0J0

[21] Appl. No.: 09/490,988

[22] Filed: Jan. 26, 2000

[51] Int. Cl.[7] ..................................................... B60P 3/42
[52] U.S. Cl. ..................... 296/10; 296/105; 296/26.05; 296/165; 296/100.12
[58] Field of Search ........................... 296/10, 165, 26.05, 296/105, 100.12

[56] References Cited

U.S. PATENT DOCUMENTS

| | | | |
|---|---|---|---|
| 4,252,363 | 2/1981 | Rodrigue | 296/100.12 |
| 4,285,539 | 8/1981 | Cole | 296/105 |
| 4,289,346 | 9/1981 | Bourgeois | 296/105 |
| 4,639,034 | 1/1987 | Amos | 296/105 |
| 4,659,136 | 4/1987 | Martin et al. | 296/26.05 |
| 4,709,956 | 12/1987 | Bowman | 296/10 |
| 4,721,336 | 1/1988 | Jones | 296/105 |
| 4,883,305 | 11/1989 | Horton | 296/105 |
| 5,005,896 | 4/1991 | Li | 296/100 |
| 5,186,513 | 2/1993 | Strother | 296/105 |
| 5,338,084 | 8/1994 | Wardell | 296/105 |
| 5,429,403 | 7/1995 | Brasher | 296/10 |
| 5,443,295 | 8/1995 | Moberly | 296/105 |
| 5,531,497 | 7/1996 | Cheng | 296/105 |
| 5,758,921 | 6/1998 | Hall | 296/98 |
| 5,769,482 | 6/1998 | Kirk | 296/105 |
| 5,845,957 | 12/1998 | Hurst | 296/105 |
| 5,938,270 | 8/1999 | Swanson et al. | 296/105 |
| 5,951,092 | 9/1999 | Cissell | 296/100.12 |
| 6,000,745 | 12/1999 | Alexa | 296/105 |

*Primary Examiner*—D. Glenn Dayoan
*Assistant Examiner*—Kiran Patel
*Attorney, Agent, or Firm*—Joseph N. Breaux

[57] ABSTRACT

A pickup truck bed topper that is collapsible into a stored position to allow items to be transported on an open topped pickup truck bed and extended to form an enclosure to keep items being transported away from the wind and the other elements.

2 Claims, 5 Drawing Sheets

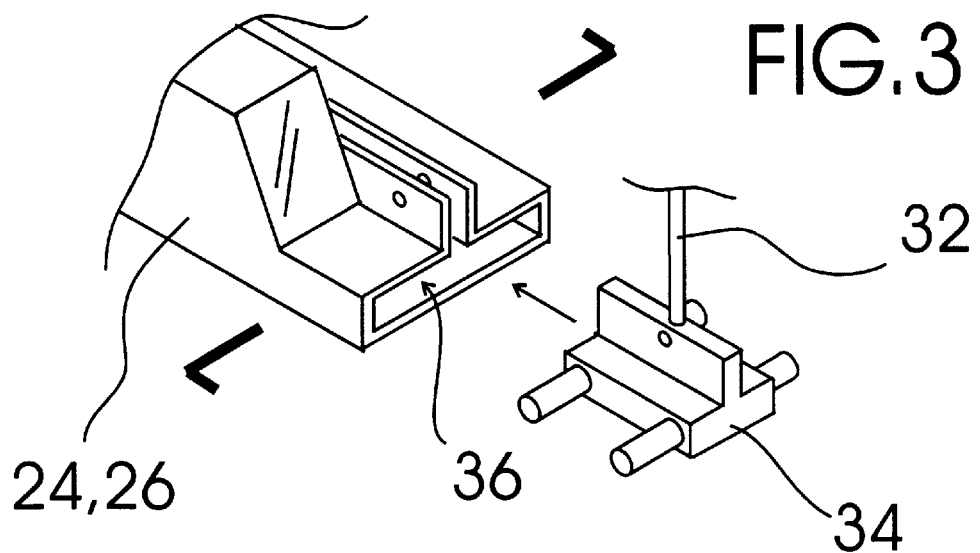
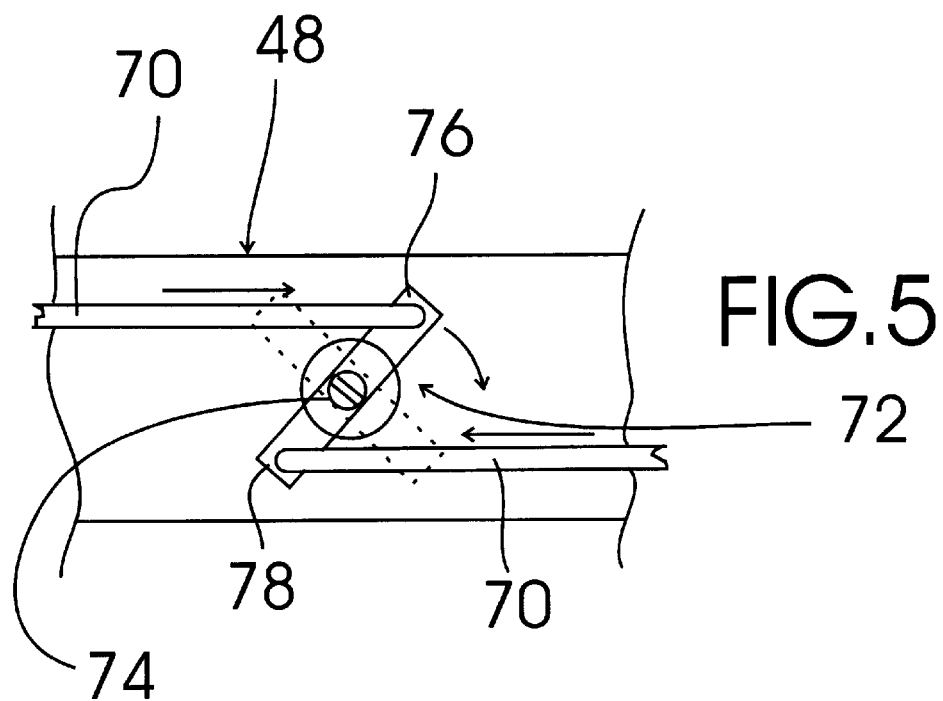

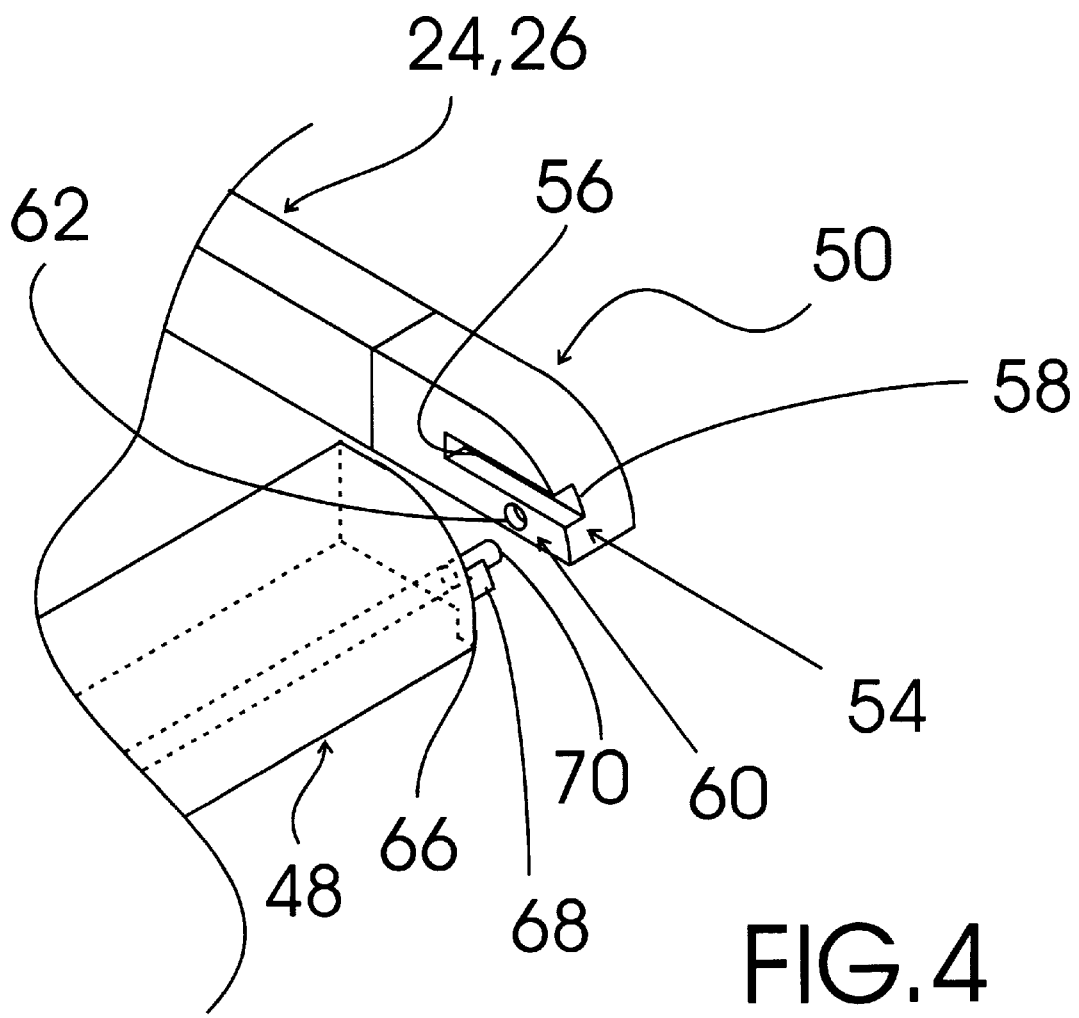

COLLAPSIBLE TRUCK BED TOPPER

TECHNICAL FIELD

The present invention relates to truck bed covers and more particularly to a collapsible truck bed topper that includes a spoiler assembly secured between the forward ends of left and right canopy support guide rails, a fabric canopy supported by a number of U-shaped canopy supports each having the two ends thereof each pivotally connected to a separate left and right roller assembly, respectively, that is slidably entrapped, respectively, to roll along the left and right canopy support guide rails between a forward position within the spoiler assembly and a rearward position exterior the spoiler assembly; a rear flap of the fabric canopy being securable to a tailgate of the pickup truck with two part interlocking fasteners when the rear flap of the fabric canopy is in the fully rearward position; the collapsible truck bed topper further including an end plate assembly lockably securable between rearward ends of the left and right canopy support guide rails such that access the two part interlocking fasteners is prevented when the rear flap of the fabric canopy is secured to the tailgate of the pickup truck and the end plate assembly is lockably secured between rearward ends of the left and right canopy support guide rails; each rearward end of the left and right canopy support guide rails including an alignment bar receiving channel having an open side and an open end and a cylinder shaped locking aperture having an open circular side; two opposed ends of the end plate assembly including an alignment bar and a retractable bolt, each alignment bar and retractable bolt being sized and positioned such that both alignment bars are positionable into the alignment bar receiving channels such that both retractable bolts are extendable into the two cylinder shaped locking apertures through the respective open circular sides thereof by rotating a lockable locking bolt actuator assembly having a rectangular center rotating actuator arm having two opposed actuator arm ends, each in pivoting connection with one of the two retractable bolts.

BACKGROUND ART

Many individuals use the bed of a pickup truck to transport a variety of items some of which are best transported in an open pickup truck bed and some of which are best transported in an enclosure away from the wind and the other elements. It would be a benefit to these individuals to have a pickup truck bed topper that was collapsible into a stored position to allow items to be transported on an open topped pickup truck bed and extended to form an enclosure to keep items being transported away from the wind and the other elements.

GENERAL SUMMARY DISCUSSION OF INVENTION

It is thus an object of the invention to provide a collapsible truck bed topper that includes a spoiler assembly secured between the forward ends of left and right canopy support guide rails, and a fabric canopy supported by a number of U-shaped canopy supports each having the two ends thereof each pivotally connected to a separate left and right roller assembly, respectively, that is slidably entrapped, respectively, to roll along the left and right canopy support guide rails between a forward position within the spoiler assembly and a rearward position exterior the spoiler assembly; a rear flap of the fabric canopy being securable to a tailgate of the pickup truck with two part interlocking fasteners when the rear flap of the fabric canopy is in the fully rearward position; the collapsible truck bed topper further including an end plate assembly lockably securable between rearward ends of the left and right canopy support guide rails such that access the two part interlocking fasteners is prevented when the rear flap of the fabric canopy is secured to the tailgate of the pickup truck and the end plate assembly is lockably secured between rearward ends of the left and right canopy support guide rails; each rearward end of the left and right canopy support guide rails including an alignment bar receiving channel having an open side and an open end and a cylinder shaped locking aperture having an open circular side; two opposed ends of the end plate assembly including an alignment bar and a retractable bolt, each alignment bar and retractable bolt being sized and positioned such that both alignment bars are positionable into the alignment bar receiving channels such that both retractable bolts are extendable into the two cylinder shaped locking apertures through the respective open circular sides thereof by rotating a lockable locking bolt actuator assembly having a rectangular center rotating actuator arm having two opposed actuator arm ends, each in pivoting connection with one of the two retractable bolts.

It is a further object of the invention to provide a collapsible truck bed topper as described above that further includes two insert tabs extending downward from each of the left and right canopy support guide rails; the insert tabs being spaced to fit into stake openings of the truck bed rails for securing the collapsible truck bed topper to the truck bed rails.

Accordingly, a collapsible truck bed topper is provided. The collapsible truck bed topper includes a spoiler assembly secured between the forward ends of left and right canopy support guide rails, and a fabric canopy supported by a number of U-shaped canopy supports each having the two ends thereof each pivotally connected to a separate left and right roller assembly, respectively, that is slidably entrapped, respectively, to roll along the left and right canopy support guide rails between a forward position within the spoiler assembly and a rearward position exterior the spoiler assembly; a rear flap of the fabric canopy being securable to a tailgate of the pickup truck with two part interlocking fasteners when the rear flap of the fabric canopy is in the fully rearward position; the collapsible truck bed topper further including an end plate assembly lockably securable between rearward ends of the left and right canopy support guide rails such that access the two part interlocking fasteners is prevented when the rear flap of the fabric canopy is secured to the tailgate of the pickup truck and the end plate assembly is lockably secured between rearward ends of the left and right canopy support guide rails; each rearward end of the left and right canopy support guide rails including an alignment bar receiving channel having an open side and an open end and a cylinder shaped locking aperture having an open circular side; two opposed ends of the end plate assembly including an alignment bar and a retractable bolt, each alignment bar and retractable bolt being sized and positioned such that both alignment bars are positionable into the alignment bar receiving channels such that both retractable bolts are extendable into the two cylinder shaped locking apertures through the respective open circular sides thereof by rotating a lockable locking bolt actuator assembly having a rectangular center rotating actuator arm having two opposed actuator arm ends, each in pivoting connection with one of the two retractable bolts.

In a preferred embodiment, the collapsible truck bed topper further includes two insert tabs extending downward from each of the left and right canopy support guide rails;

the insert tabs being spaced to fit into stake openings of the truck bed rails for securing the collapsible truck bed topper to the truck bed rails.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 3 is a partial cutaway detail view showing a portion of one of the left and right canopy support guide rails, a portion of one of the two ends of one of the U-shaped canopy supports pivotally connected to one of the roller assemblies.

FIG. 4 is a detail perspective view of one of the rearward ends of one of the left and right canopy support guide rails showing the alignment bar receiving channel and the locking aperture and one of the sides of the end plate assembly showing the alignment bar and the retractable bolt.

FIG. 5 is a front plan view of the rotating lockable locking bolt actuator assembly.

EXEMPLARY MODE FOR CARRYING OUT THE INVENTION

Figure 1:
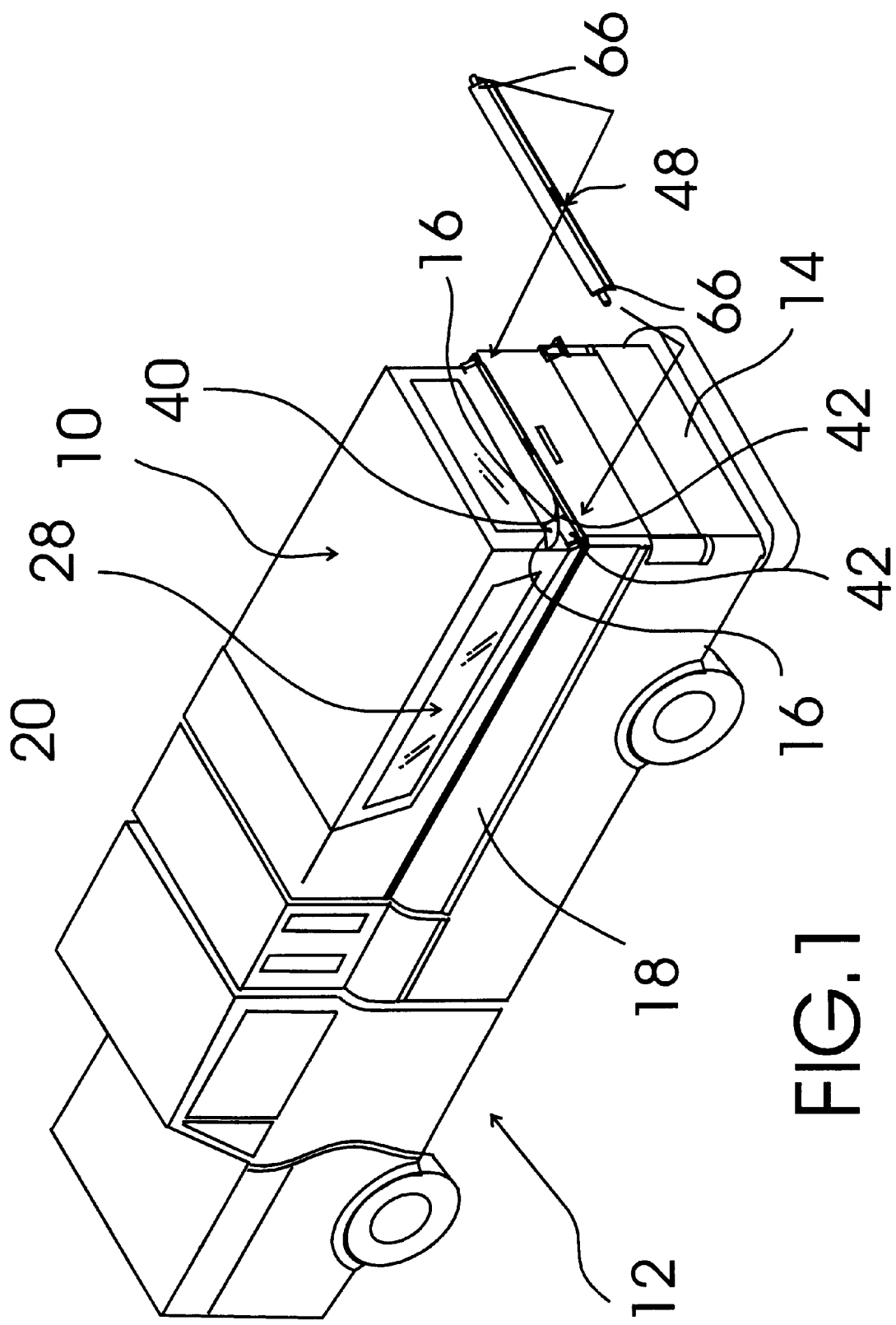
FIG. 1 is a perspective view of an exemplary embodiment of the collapsible truck bed topper of the present invention adapted for securing to the truck bed side rails with bolts and including a spoiler assembly secured between the forward ends of left and right canopy support guide rails, and a fabric canopy supported by a number of U-shaped canopy supports each having the two ends thereof each pivotally connected to a separate left and right roller assembly, respectively, that is slidably entrapped, respectively, to roll along the left and right canopy support guide rails between a forward position within the spoiler assembly and a rearward position exterior the spoiler assembly; a rear flap of the fabric canopy being securable to a tailgate of the pickup truck with two part interlocking fasteners when the rear flap of the fabric canopy is in the fully rearward position; the collapsible truck bed topper further including an end plate assembly lockably securable between rearward ends of the left and right canopy support guide rails such that access the two part interlocking fasteners is prevented when the rear flap of the fabric canopy is secured to the tailgate of the pickup truck and the end plate assembly is lockably secured between rearward ends of the left and right canopy support guide rails.
Figure 2:
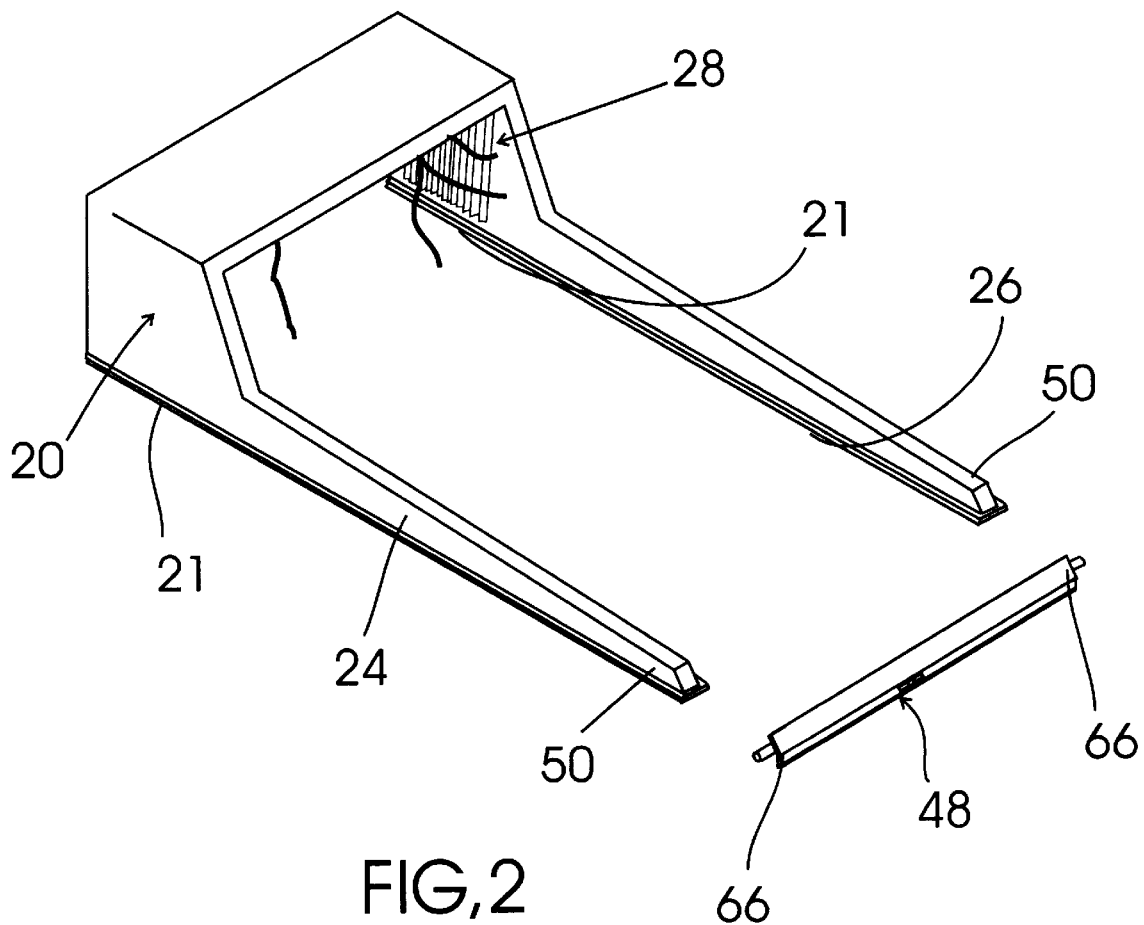
FIG. 2 is a perspective view of an exemplary embodiment of the collapsible truck bed topper that is securable to the truck bed side rails with bolts.

FIGS. 1–5 show various aspects of a first exemplary embodiment of a collapsible truck bed topper of the present invention, generally designated 10, adapted for use with a pickup truck, generally designated 12, of the type having a tailgate 14 with a top edge provided with a number of male snap fasteners 16 and two opposed side truck rails 18. Collapsible truck bed topper 12 includes a spoiler assembly, generally designated 20 secured between the forward ends 21 of left and right canopy support guide rails, 24,26 respectively, and a fabric canopy, generally designated 28 supported by a number of U-shaped canopy supports 30 (see also FIG. 6) each having the two ends 32 thereof each pivotally connected to a separate left and right roller assembly 34, respectively, that is slidably entrapped, respectively, to roll along a guide channel 36 of the left and right canopy support guide rails between a forward position (shown in FIG. 2) within spoiler assembly 20 and a rearward position (shown in FIG. 1) exterior spoiler assembly 20. A rear flap 40 of fabric canopy 28 being securable to the male snap fasteners 16 of tailgate 14 with female fastener halves 42 that are companionate with the male snap fasteners 16 of tailgate 14. When rear flap 40 is thus secured, the ends 32 of U-shaped support rod 30 supporting rear flap 40 is oriented at and angle "A" of forty-five degrees.

Collapsible truck bed topper 10 also includes an end plate assembly, generally designated 48, lockably securable between rearward ends 50 of left and right canopy support guide rails 24,26 such that access the female fastener halves 14 is prevented when rear flap 40 of fabric canopy 28 is secured to tailgate 14 of pickup truck 12 and end plate assembly 48 is lockably secured between rearward ends 50 of left and right canopy support guide rails 24,26. Each rearward end 50 of left and right canopy support guide rails 24,26 include an alignment bar receiving channel, generally designated 54, having an open side 56 and an open end 58 and a cylinder shaped locking aperture, generally designated 60, having an open circular side 62. Two opposed ends 66 of end plate assembly 48 each include an alignment bar 68 and a retractable bolt 70. Each alignment bar 68 and retractable bolt 70 is sized and positioned such that both alignment bars 68 are positionable into alignment bar receiving channels 54 such that both retractable bolts 70 are extendable into the two cylinder shaped locking apertures 60 through the respective open circular sides 62 thereof by rotating a lockable locking bolt actuator assembly, generally designated 72, having a rectangular center rotating actuator arm 74 having two opposed actuator arm ends 76,78, each in pivoting connection with one of the two retractable bolts 70.

Figure 6:
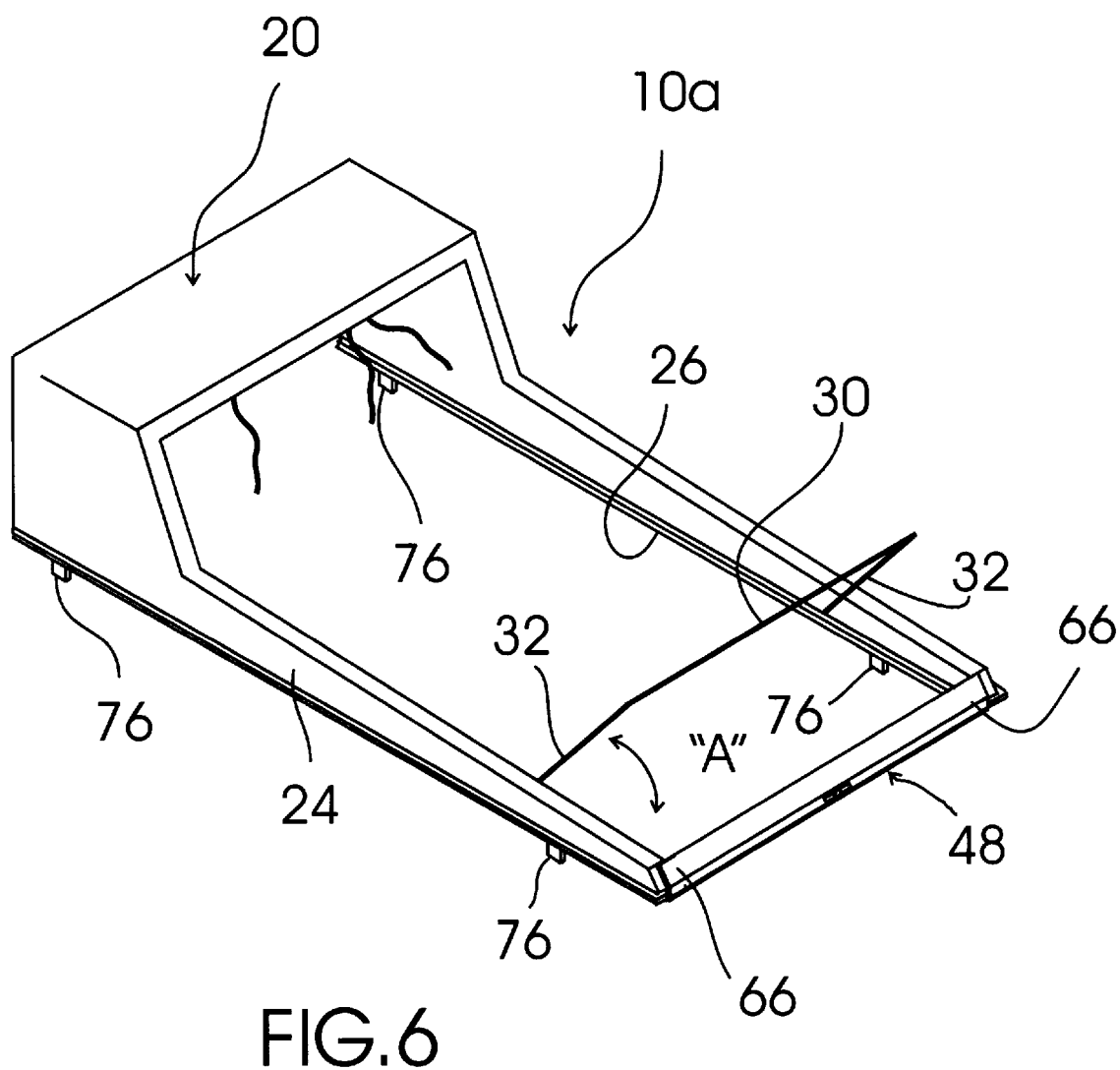
FIG. 6 is a perspective view of a second exemplary embodiment of the collapsible truck bed topper that is identical in all respects to the embodiment shown in FIG. 1 except this embodiment includes two insert tabs extending downward from each of the left and right canopy support guide rails that are spaced to fit into the stake openings of the truck bed rail for securing the collapsible truck bed topper to the truck bed rails.

FIG. 6 shows a second exemplary collapsible truck bed topper of the invention, generally designated 10a that is identical in all respects to collapsible truck bed topper 10 except that collapsible truck bed topper 10a also includes two insert tabs 76 extending downward from each of the left and right canopy support guide rails 24,26. The insert tabs 76 are spaced to fit into stake openings of the truck bed rails 18 for securing collapsible truck bed topper 10a to truck bed rails 18.

It can be seen from the preceding description that a collapsible truck bed topper has been provided.

It is noted that the embodiment of the collapsible truck bed topper described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A collapsible truck bed topper comprising:

a spoiler assembly secured between forward ends of a left and a right canopy support guide rail; and a fabric canopy supported by a number of U-shaped canopy supports each having said two ends thereof each pivotally connected to a separate left and right roller assembly, respectively, that is slidably entrapped, respectively, to roll along said left and right canopy support guide rails between a forward position within said spoiler assembly and a rearward position exterior said spoiler assembly;

a rear flap of said fabric canopy being securable to a tailgate of said pickup truck with two part interlocking fasteners when said rear flap of said fabric canopy is in said fully rearward position;

said collapsible truck bed topper further including an end plate assembly lockably securable between rearward ends of said left and right canopy support guide rails such that access said two part interlocking fasteners is prevented when said rear flap of said fabric canopy is secured to said tailgate of said pickup truck and said end plate assembly is lockably secured between rearward ends of said left and right canopy support guide rails;

each rearward end of said left and right canopy support guide rails including an alignment bar receiving channel having an open side and an open end and a cylinder shaped locking aperture having an open circular side;

two opposed ends of said end plate assembly including an alignment bar and a retractable bolt, each alignment bar and retractable bolt being sized and positioned such that both alignment bars are positionable into said alignment bar receiving channels such that both retractable bolts are extendable into said two cylinder shaped locking apertures through a respective open circular sides thereof by rotating a lockable locking bolt actuator assembly having a rectangular center rotating actuator arm having two opposed actuator arm ends, each in pivoting connection with one of said two retractable bolts.

2. The collapsible truck bed topper of claim 1 further comprising:

two insert tabs extending downward from each of said left and right canopy support guide rails;

said insert tabs being spaced to fit into stake openings of truck bed rails of a truck for securing said collapsible truck bed topper to the truck bed rails of the truck.

* * * * *